United States Patent [19]

Fathauer

[11] 4,149,163

[45] Apr. 10, 1979

[54] WIRELESS SEED DETECTING AND MONITORING APPARATUS

[75] Inventor: George H. Fathauer, Mesa, Ariz.

[73] Assignee: Dickey-john Corporation, Auburn, Ill.

[21] Appl. No.: 794,551

[22] Filed: May 6, 1977

Related U.S. Application Data

[63] Continuation of Ser. No. 629,889, Nov. 7, 1975, abandoned, which is a continuation-in-part of Ser. No. 592,555, Jan. 22, 1975, abandoned.

[51] Int. Cl.² .............................................. G08B 21/00
[52] U.S. Cl. ..................................... 340/684; 340/539; 340/674
[58] Field of Search ................... 340/259, 224, 258 C, 340/258 D, 267 R, 674, 539, 558, 684; 235/92 PC; 73/69, 649; 329/122, 124

[56] References Cited

U.S. PATENT DOCUMENTS

| 2,282,102 | 5/1942 | Tunick | 340/224 |
|---|---|---|---|
| 2,683,869 | 7/1954 | Norris et al. | 390/224 |
| 3,469,198 | 9/1969 | Madsen | 329/122 |
| 3,517,268 | 6/1970 | Webb | 329/122 |
| 3,723,989 | 3/1973 | Fathauer et al. | 340/259 |
| 3,757,315 | 9/1973 | Birchfield et al. | 340/224 |
| 3,782,730 | 1/1974 | Horchler | 325/105 |

Primary Examiner—Glen R. Swann, III
Attorney, Agent, or Firm—Olson, Trexler, Wolters, Bushnell & Fosse, Ltd.

[57] ABSTRACT

A wireless seed detecting and monitoring apparatus includes one or more transmitter units mounted at the seed planter and a receiver unit mounted in a monitor console located at a remote location. Seeds being planted produce a signal which modulates an r-f transmitted signal during the planting operation. A receiver is responsive to the r-f transmitted signal and detects the modulated signal information corresponding to seeds being planted. This detected signal is then delivered to monitoring circuitry to indicate the operation of the seed planter.

6 Claims, 9 Drawing Figures

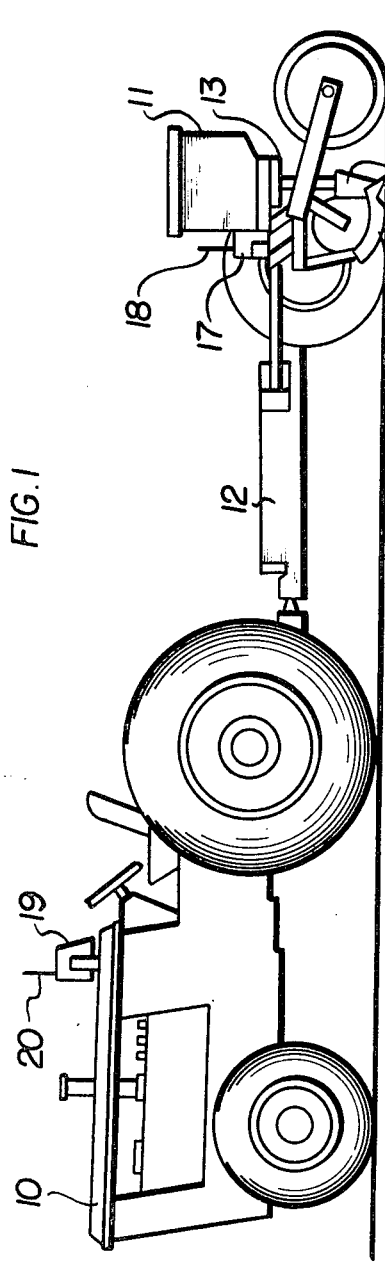
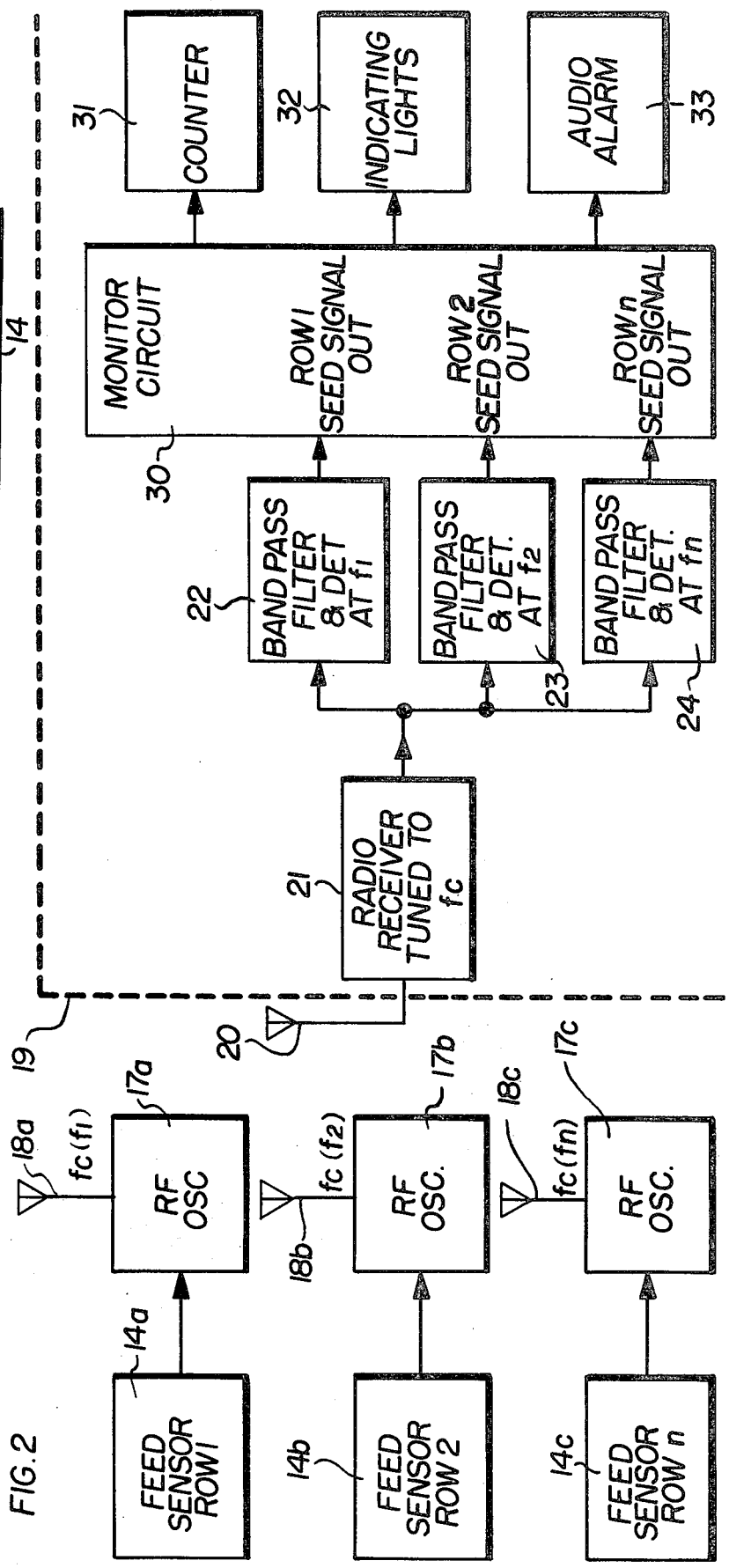

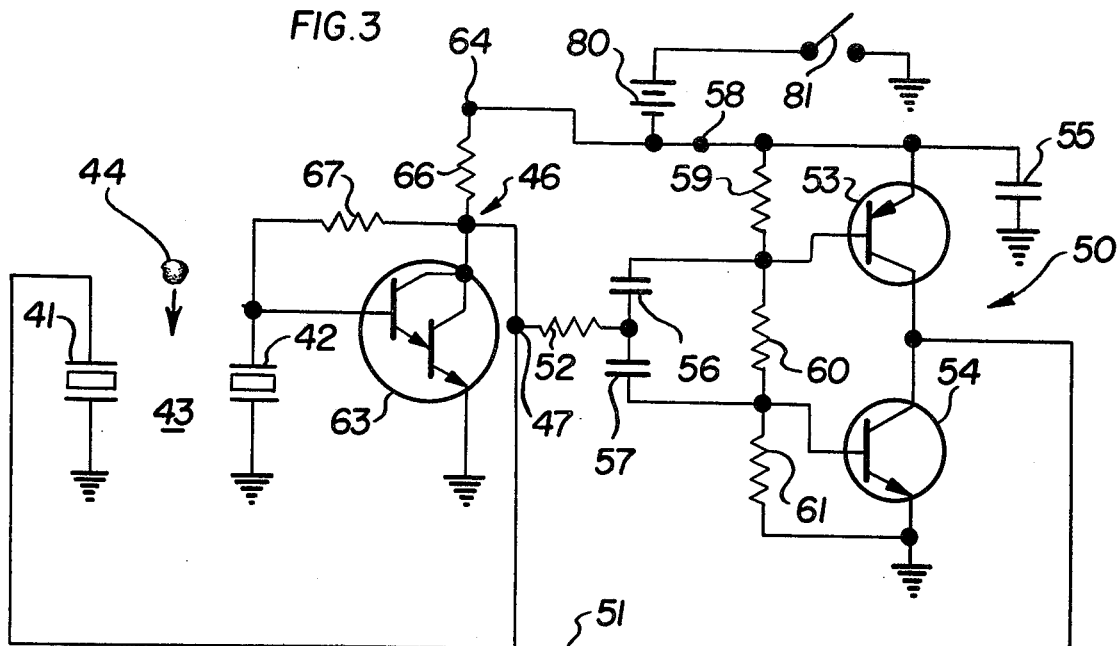
FIG.3
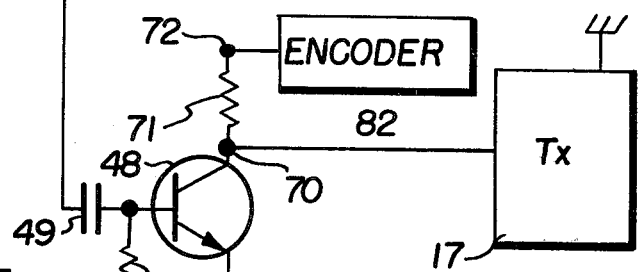
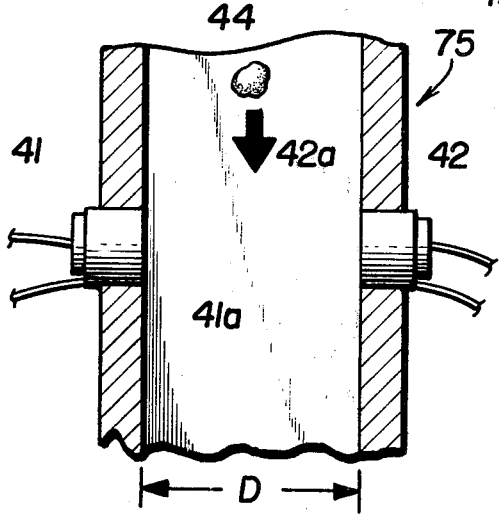
FIG.4
FIG.5
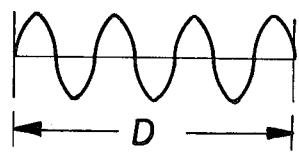

WIRELESS SEED DETECTING AND MONITORING APPARATUS

CROSS-REFERENCES TO RELATED APPLICATIONS

This is a continuation of application Ser. No. 629,889 filed Nov. 7, 1975, now abandoned, which was a continuation-in-part of application Ser. No. 542,555 filed Jan. 22, 1975, now abandoned.

BACKGROUND OF THE INVENTION

This invention relates generally to monitoring apparatus and more particularly to a seed detecting and monitoring system for a multi-row seed planter. While certain features of this invention may be adapted for many different uses, the disclosure will be facilitated by directing it particularly to the problems of monitoring seeds being discharged in a seed planter which is pulled by a tractor.

As is well known, a farmer engaged in mechanized planting of various seeds utilizes a planting machine pulled behind a tractor. Such planting machines usually include a plurality of separate planting devices or dispensers supplied with seed from separate hoppers so that a plurality of rows of seeds may be planted at one time. With planting equipment of this type it is usually difficult if not impossible for a farmer to determine the rate at which seeds are being planted during the actual planting operation. Also, there have been many instances where one or more of the planting units have failed to plant any seed at all without the farmer being aware of the fact for a relatively long period of time. When this happens, of course, one or more of the plurality of rows of seeds being planted will be void of crop during the growing season.

To overcome these problems, planter monitor systems have been developed to monitor the seeds being planted and to indicate to the farmer, while operating the tractor, that a malfunction has occurred in one or more of the seed dispensers. The farmer would then correct the malfunction and thereafter continue to plant a plurality of rows of seed simultaneously with assurance that seeds are being planted in each row. One such seed planter monitor which has been quite successful is of the type disclosed in U.S. Pat. No. 3,723,989 to Fathauer et al. which issued Mar. 27, 1973 and is assigned to the same assignee.

This type of planter monitor requires a cable or wire to be interconnected between each of the seed sensing units and its associated seed dispenser and the monitor console unit which is located on the tractor in front of the tractor operator. The interconnecting cable between the monitor console and the seed sensors sometimes presents problems in that the connectors may come loose or the wires associated therewith break as a result of vibration and other mechanical stresses applied to the cable during normal operation of the seed planter. Furthermore, each time the planter is connected to the tractor for a planting operation, cables associated with the monitoring system must also be connected. Should it be necessary for the farmer to disconnect the planter during a planting operation, the cables must then be disconnected. This is a time-consuming operation and reduces the overall efficiency of the farmer's planting operation.

SUMMARY OF THE INVENTION

Accordingly, it is an object of this invention to provide a new and improved seed detector and monitoring apparatus.

It is another object of this invention to provide such a seed detector and monitoring apparatus which eliminates the need for an interconnecting cable between the monitor console and the seed-detecting units.

Still another object of this invention is to provide a seed detector and monitoring apparatus which is inexpensive and easy to manufacture while providing a high degree of reliability and efficiency when in use.

Briefly, the seed detecting and monitoring apparatus of this invention includes a plurality of seed sensors for producing signals which correspond to seeds being planted. The seed sensors are coupled to r-f transmitter means which radiates an r-f signal modulated in accordance with the seed sensor signals. Each seed dispenser has an associated seed sensor and r-f transmitter. To distinguish which row of seeds is being monitored, either the frequency of the r-f transmitter of each row can be different or each modulated signal from the seed sensor can be different to identify the particular row. Also, the seed sensor may incorporate ultrasonic transducer means operating at different frequencies, each different ultrasonic frequency corresponding to a different row of seed being planted. Furthermore, digital encoding can be used to identify each of the channels or rows being monitored.

A monitor console is mounted on the tractor in front of the tractor operator and provides readout means such as a counter, indicating lights, and the like, as well as audible signal means for attracting the attention of the operator when a malfunction occurs. The console monitor includes a receiver having a detector for detecting the modulated signals from the r-f frequency and delivering these signals to corresponding channels associated with the monitor detector. A monitor system which is suitable for use in this manner is disclosed in the 3,723,989 patent mentioned above.

One structural arrangement for accomplishing the seed-sensing in accordance with this invention incorporates a plurality of individual crystal-controlled transmitters in a given frequency band but spaced apart by 25 kilohertz (kHz). For example, one transmitter may have a frequency of 71.90 megahertz (MHz) while the transmitter for an adjacent seed dispenser may have a frequency of 71.925 MHz and the transmitter for the next adjacent seed dispenser may have a frequency of 71.95 MHz and so on. Thus, an application of the invention employing 16 transmitters having 16 different frequencies could simultaneously monitor 16 dispensers planting 16 rows of seeds. Frequency signal information corresponding to the seeds being planted for a number of rows is simultaneously radiated by each of the transmitter units. At the monitor console a receiver is provided which preferably is tuned to receive only the frequencies of interest (e.g., 71 to 73 MHz). A mixer circuit in conjunction with a local oscillator operating at a frequency of 71.8 MHz, converts the received signals to the range of an intermediate frequency (IF) (e.g., 100 kHz for the lowest frequency transmitter unit and as high as 475 kHz for the highest frequency transmitter unit). The output signals of the IF stage corresponds to the frequencies of the transmitters associated with the various dispensers. These signals are decoded by narrow band-pass elements and therefrom applied to counting circuit means.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a side elevational view of a seed planter in combination with a tractor wherein the seed detecting and monitoring apparatus of this invention is utilized;

FIG. 2 is a simplified block diagram of a wireless seed detecting and monitoring apparatus constructed in accordance with the principles of this invention;

FIG. 3 is a schematic circuit diagram of one form of seed detector which can be utilized with the wireless seed sensing and monitoring apparatus of this invention;

FIG. 4 is a fragmentary sectional view illustrating the mounting of a pair of piezoelectric ceramic elements to a seed discharge chute to be effective as a seed sensor in accordance with this invention;

FIG. 5 is a waveform which illustrates that the distance D shown in FIG. 2 is maintained an integral number of half-wavelengths;

DETAILED DESCRIPTION OF THE ILLUSTRATED EMBODIMENT

Figure 6:
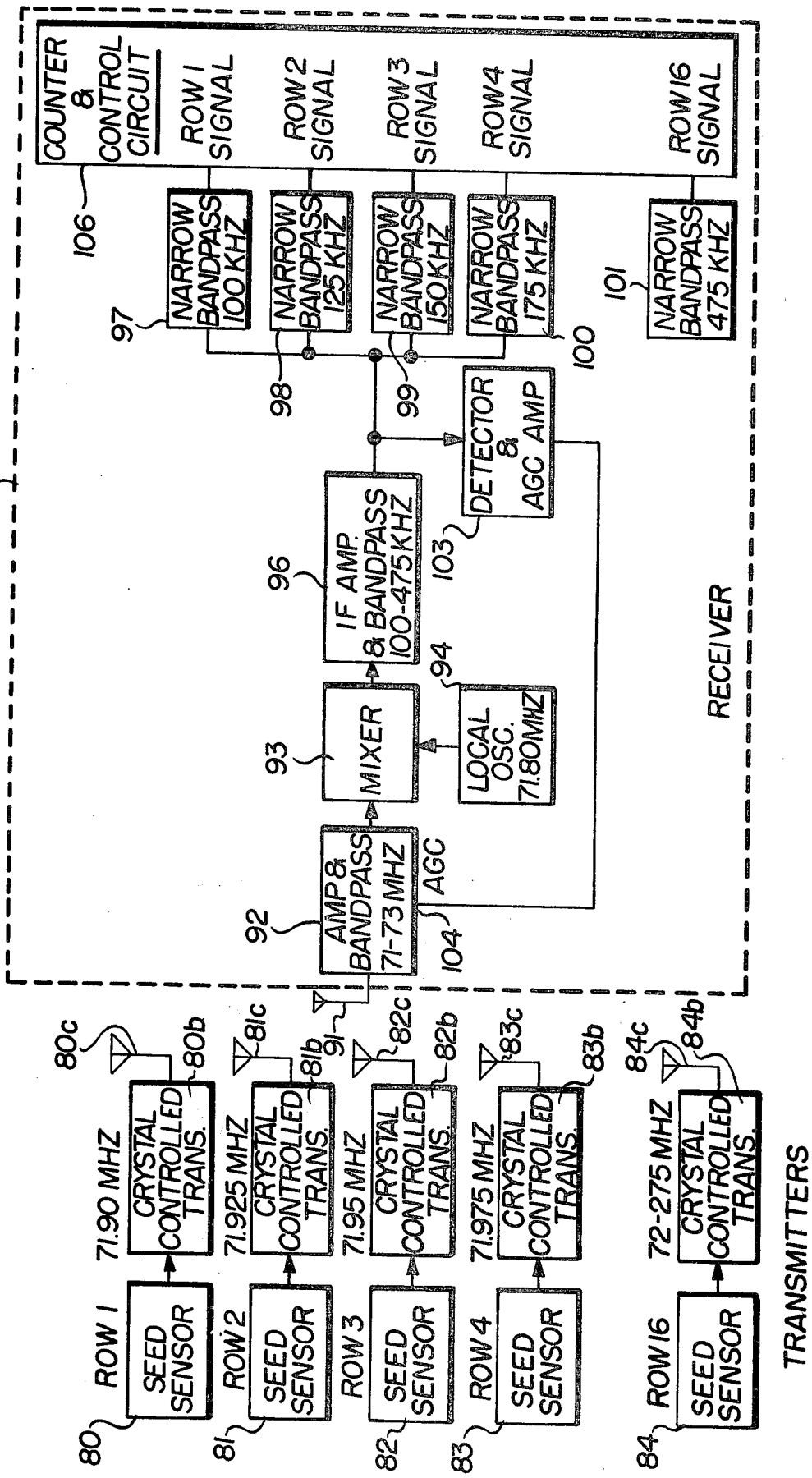
FIG. 6 is a detailed block diagram of one combination of elements and frequencies which can be utilized to form the wireless seed detecting and monitoring apparatus of this invention.

With reference to FIG. 1, the basic components of a preferred embodiment of a wireless seed detecting and monitoring apparatus constructed in accordance with the present invention are illustrated in an application particularly suitable for the invention. A tractor 10, or any other suitable vehicle, is utilized to transport a seed hopper 11 or a plurality of such hoppers extending transversely of the tractor's direction of travel over a field to be planted with seeds. The connection made between the tractor 10 and the hopper 11 can be made by any suitable arrangement, here being illustrated by means of a tow bar 12 which may include rotary shaft means or hydraulic pump means for operating hydraulically driven motors associated with the dispensing portion of the seed planter. Positioned below the hopper 11 is a seed-dispensing mechanism 13 which directs the seed to be planted downwardly into furrows, or the like, formed in the ground beneath the hopper. The seed-dispensing mechanism can be operated by a variable speed drive means such as a variable speed hydraulic motor or the like and forms no part of the present invention. Immediately beneath the seed dispenser 13 is a seed sensor 14 which produces an electrical signal when a seed passes therethrough and is directed to the ground. The electrical signals can take a plurality of different forms, such as pulse signal information or frequency signal information.

In accordance with one feature of this invention, a self-contained transmitter unit 17 is mounted on the seed dispenser 13 and has the r-f frequency output thereof modulated with the signal information produced by the seed sensor 14. The modulated r-f frequency signal information from the transmitter 17 is radiated therefrom by antenna means 18 and received by a receiver mounted within a console monitor 19 located on the tractor 10. A receiving antenna 20 may be associated therewith to insure reception of the radiated signal from the transmitter 17. By so providing a self-contained transmitter unit 17, operating from its own battery pack which may comprise either disposable or rechargeable batteries, the need for interconnecting cables between the planter unit 13 and the tractor 10 is eliminated.

In operation, the farmer need merely start the tractor, set the console monitor 19 for the desired information, such as the density of seed population desired in the field, and then pull the hopper or hoppers behind the tractor at any desired speed. The rate of movement of the tractor over the ground is detected by any suitable means, but preferably by means for producing pulse signals corresponding to incremental distances traveled, and these pulses are then delivered to the console monitor 19 for comparison with control signals generated by the transmitter unit 17 to provide information such as population density of seeds. The console monitor 19 may include circuitry for other forms of monitoring such as maintaining the seed density within a predetermined population by indicating lights or determining a malfunction in a seed dispenser which prevents seeds from being planted. A counter may also be associated with the console monitor to indicate the overall number of seeds planted or the number of seeds per unit area.

For a better understanding of the wireless seed dispensing and monitoring apparatus of this invention, reference is now made to FIG. 2 which illustrates a plurality of transmitter units 17a, 17b and 17n. Coupled to the transmitter units 17a, 17b and 17n are the seed sensor units 14a, 14b, and 14n, respectively. The transmitter units 17a, 17b, and 17n in the illustrated embodiment all operate on the same frequency but have their signal information modulated with signals corresponding to the particular seed sensor coupled thereto. Therefore, each signal radiated from the antenna elements 18a, 18b and 18n is identified according to its row position. Of course, any number of transmitter-sensor combinations may be used without departing from the principles of the present invention.

The console monitor 19 includes a radio receiver circuit 21 which is tuned to the center frequency (fc) radiated by the transmitter units 17a, 17b and 17n. The output of the radio receiver 21 is delivered to a plurality of band-pass filter circuits 22a, 22b and 22n, each of which includes detector means for detecting the modulated signal information corresponding to the various rows of the planter. For example, the band-pass filter and detector circuit 22a detects the modulated signal information from the transmitter unit 17a, which corresponds to the seed signal produced by the seed sensor 14a. Similarly, the band-pass filter and detector circuit 22b detects the modulated signal from transmitter 17b and produces a seed signal corresponding to the seed signal produced by the seed sensor 14b. In like manner, the band-pass filter and detector circuit 22n detects the modulated signal information from the transmitter unit 17n and produces a seed signal corresponding to the seed signal produced by seed sensor 14n.

The output of the band-pass filter and detector circuits 22a, 22b, and 22n are applied to a monitor circuit 30 which may be of the type disclosed in the aforementioned 3,723,989 patent. While this type of monitor circuit is illustrated herein in conjunction with the wireless seed dispensing and monitoring apparatus of this invention, it is understood that other monitor circuit arrangements can be utilized in accordance with the principles of the present invention. The output of the monitor circuit 30 may be coupled to a plurality of functional devices for indicating various operating conditions of the seed planter. For example, the output of monitor circuit 30 illustrated in FIG. 2 is coupled to a counter 31 which may provide a seed count of the total number of seeds planted or the rate at which the seeds are being planted. This information may be combined with information corresponding to the rate of speed of the planter to develop seed population data (i.e., the number of seeds planted per unit area).

The output of the monitor circuit 30 also may be coupled to a plurality of indicating lights 32 as depicted in FIG. 2, with there being one indicating light (not shown), for example, for each row of seeds being planted. The indicating lights may be operative to indicate that a malfunction in a particular row has occured and may be accomplished either by having the indicating light energized when a malfunction occurs or de-energized when a malfunction occurs. To attract the attention of the tractor operator, the monitor circuit 30 illustrated in FIG. 2 also is coupled to an audio alarm circuit 33. The counter circuit 31, the indicating light circuit 32 and the audio alarm circuit 33 may also be of the type disclosed in the 3,723,989 patent previously mentioned herein.

FIGS. 3, 4, and 5 show one form of seed-sensing device 14 comprising an ultrasonic sensor for detecting the passage of seeds through a seed dispenser, and which may be used in the practice of this invention although any other suitable sensing device including mechanical switches and photoelectric means may be employed if desired. Seed-sensing device 14 includes a pair of spaced apart piezoelectric transducer elements 41 and 42 which function as a transmitting ultrasonic device and a receiving ultrasonic device, respectively. In the illustrated embodiment, the ceramic elements 41 and 42 are mass-loaded piezoelectric devices as is known in the art. The spacing 43 between the piezoelectric devices is arranged to receive a plurality of successive high velocity seeds designated generally by reference numeral 44. The passage of each seed 44 between the transmitting device 41 and the receiving device 42 produces a change in the output amplitude of a receiver amplifier circuit designated generally by reference numeral 46. This change in output amplitude is sensed at a circuit point 47 which, in turn, is capacitively coupled to an output amplifying transistor 48 through a capacitor 49.

The transmitting ultrasonic transducer element 41 is driven by a push-pull driver amplifier circuit arrangement 50 which is connected thereto over a line 51. The combination of the driver circuit 50 and the receiver circuit 46 together with the transmitting and receiving ultrasonic transducer elements 41 and 42, respectively, and the air gap 13 therebetween, function as a closed-loop oscillator circuit. The feedback for the oscillator circuit is obtained from the circuit point 47 and applied to the input of the driver stage 50 through a resistor 52. This feedback is coupled to the base electrode of a pair of amplifying transistors 53 and 54 through a pair of coupling capacitors 56 and 57, respectively. Transistors 53 and 54 are operated as a push-pull amplifier stage to provide driving power for the ultrasonic transducer element 41. The emitter of transistor 53 is connected to ground through filter capacitor 55.

Operating bias potential for transistors 53 and 54 is obtained from a fixed voltage source connected to terminal 58. In the embodiment of the invention illustrated in FIG. 3, this operating potential preferably is obtained from a self-contained battery source 80 in series with an on/off switch 81. The battery 80 may be of a rechargeable or non-rechargeable type, as desired. The voltage supplied by battery 80 is applied to the base of transistor 53 through a biasing resistor 59. Bias voltage from battery 80 is also applied to the base of transistor 54 through resistor 59 and a second resistor 60 which, in turn, forms a voltage divider network with a resistor 61. An output signal is developed at the junction between the collectors of transistors 53 and 54 and is applied to ultrasonic transducer element 41.

An amplifier circuit 46 is provided in the embodiment of the invention illustrated in FIG. 3 and it comprises a pair of direct-coupled transistors 63 in a Darlington configuration which is well known in the art. While a single conventional Darlington unit is illustrated herein, it is understood that the circuit configuration can be formed by two discrete transistors connected as shown in FIG. 3. Furthermore, it is understood that operational amplifiers or other high gain amplifier circuits can be used where desired without departing from the principles of the present invention. Operating voltage for amplifier stage 46 is obtained from battery 80 and bias voltage for transistor 63 is supplied by a resistor 67. As discussed in greater detail below, an object such as a seed passing between transducers 41 and 42 alters the feedback signal path which results in a corresponding change in the signal at the output of amplifier stage 46. This change may take the form of a reduction in the amplitude of the output signal in response to the reduction in coupling energy between transducer 41 and transducer 42 caused by the seed 44 passing therethrough. The output signal is applied to the base of a switching transistor 48 by means of a coupling capacitor 49.

The signal applied to the base of transistor 48 may be an oscillatory signal having a frequency in the order of about 80 KHz. Transistor 48 is connected as shown to rectify this voltage between the base emitter junction of the transistor. This, together with the DC bias developed across capacitor 49 and resistor 68, will cause transistor 48 to be rendered conductive so that the output terminal 70 thereof is substantially at ground potential. A reduction of the signal applied to transistor 48 renders transistor 48 substantially instantaneously non-conductive, which increases the impedance between its collector and ground to essentially that of an open circuit. Coupled to the collector of transistor 48 by way of resistor 71 is an encoding circuit 82. In the embodiment of the invention illustrated in FIG. 3, the encoder 82 generates a low-frequency signal of a predetermined value and which is substantially shunted to ground potential through a transistor 48 while the transistor is conductive. When transistor 48 is rendered non-conductive, the frequency from encoder 82 is coupled to the input of the transmitter unit 17 to modulate the output signal obtained therefrom.

With reference to FIG. 4, the seed-dispensing chute through which seeds are directed en route to being planted provides a support unit 75 for ultrasonic transmitter unit 41 and ultrasonic receiver unit 42. Ultrasonic transducer elements 41 and 42 are fixedly secured to support unit 75 and maintained a distance D apart, as graphically illustrated in FIG. 5. As the seeds 44 pass between the ultrasonic transducer elements 41 and 42, the ultrasonic field is altered or disturbed to thereby reduce the amount of energy transferred between transducer 41 and transducer 42. FIG. 5 illustrates that the distance D is preferably made an integral number of half-wavelengths of the ultrasonic signal so that maximum efficiency of coupling between the transmitter element 41 and receiving element 42 is maintained. This integral number of half-wavelengths of the spacing D substantially increases the sensitivity of the overall ultrasonic oscillator circuit so that high velocity, relatively small articles passing therethrough will produce a detectable change in circuit operation to control the function of transistor 48. While FIG. 5 illustrates 7 half-wavelengths, or 3½ full wavelengths of the transmitted energy as corresponding to the distance D, it will be understood that any suitable number of half-wavelengths may be utilized.

In the illustrated embodiment the frequency of 80 KHz will provide ½ wavelengths which correspond approximately to 80 thousandths of an inch. This dimension is determined by the product of the frequency and the velocity of propagation of the ultrasonic energy between the transmitter element 41 and the receiving element 42. The circuitry illustrated herein will operate from a power source which provides approximately 4 milliwatts of power. This low power requirement is readily obtained from a small 6 volt battery which may correspond to the battery 80. A power source formed from a plurality of "penlite" or size "AA" cells therefore will operate the circuitry for many hours. For example, the circuitry illustrated herein will operate from four 1.5-volt cells (6 volts when connected in series) continuously for 24 hours a day for a period of 2 months. This therefore provides a simple wireless seed detecting and monitoring apparatus which eliminates the requirement of interconnecting cables between the seed planter and the monitor unit.

Referring now to FIG. 6, there is seen a detailed block diagram of one specific configuration of wireless seed monitor constructed in accordance with the principles of this invention. Here, a plurality of individual sensor and transmitter units 80, 81, 82, 83 and 84 are illustrated. The number of units between units 83 and 84 may be 11 or more, thereby giving a total capacity of the system of 16 rows. Each of the units has its own separate seed sensor 80a, 81a, 82a, 83a and 84a and its own separate crystal-controlled transmitter unit 80b, 81b, 82b, 83b and 84b. In the illustrated embodiment, transmitter unit 80b is preferably operated at a frequency of 71.90 Mhz, transmitter 81b is operated at 71.925 Mhz, transmitter 82b is operated at 71.95 Mhz, transmitter unit 83b is operated at 71.975 Mhz, and transmitter unit 84b is operated at 72.275 Mhz. Each of the transmitters thus are 25 Khz apart in frequency.

The individual transmitter units are coupled to their respective antenna units 80c, 81c, 82c, 83c, and 84c. Each unit may be operated by a small self-contained dry-cell battery and, therefore, completely eliminate the need for interconnecting cables between the individual transmitter units and between the transmitter and receiver systems.

The monitor and read-out unit is designated generally by reference numeral 90 and includes a single antenna 91 for receiving all of the frequencies from the antennas 80c-84c. The antenna 91 is coupled to an amplifier and band-pass circuit 92. The bandwidth of circuit 92 is in the order of about 2 Mhz from between 71 to 73 Mhz inclusive.

The output of the band-pass amplifier 92 is delivered to a mixer circuit 93 which, in turn, is coupled to a local oscillator 94. The frequency of the local oscillator 94 is 71.8 Mhz and, therefore, provides a different frequency of between 100 to 475 Khz when mixed with the various frequencies from the crystal-controlled transmitters 80b through 84b. The output of the mixer is delivered to an IF amplifier and band-pass circuit 96 which is capable of passing frequencies from between 100 to 475 Khz. The output of the IF amplifier and band-pass circuit 96 is delivered to a plurality of narrow band-pass circuits 97, 98, 99, 100 and 101. These narrow band-pass circuits are adapted to receive the seed signal information as transmitted by the associated transmitter units 80b–84b. The output of IF amplifier and band-pass circuit 96 is also coupled to a detector and AGC amplifier circuit 103 which, in turn, is coupled back to an input terminal 104 of the amplifier and band-pass circuit 92. This provides suitable gain control for the circuit.

The output of the narrow band-pass units 97, 98, 99, 100 and 101 are coupled to a counter and control circuit 106 which can be similar to the monitor circuit 30 of FIG. 2. This counter and control circuit can be the same as that disclosed in Fathauer Pat. No. 3,723,989.

Figure 7:
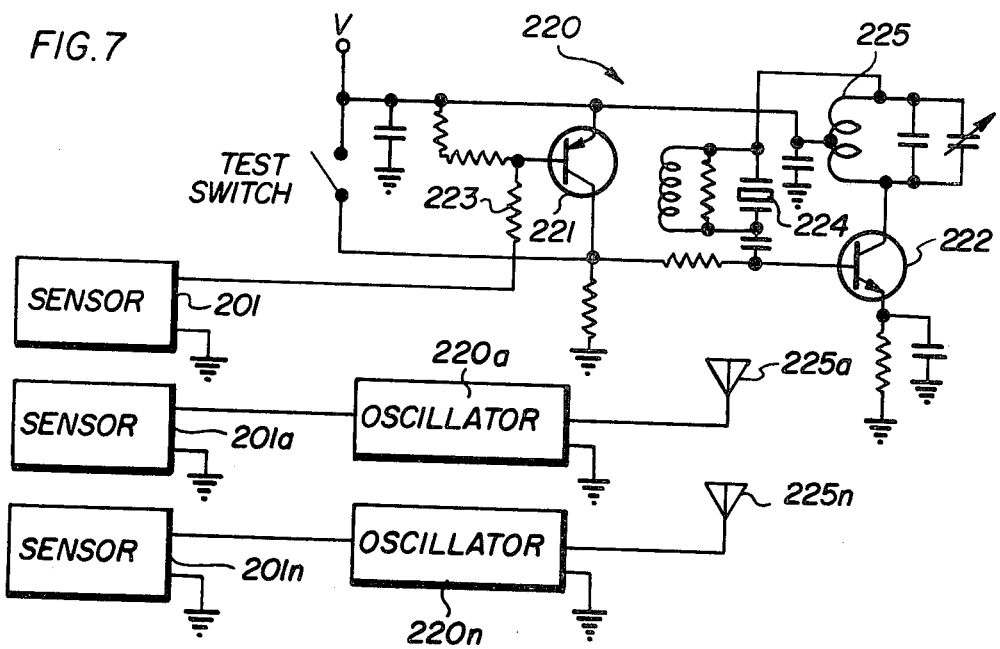
FIG. 7 is a schematic circuit diagram of an alternative embodiment of a transmitter which employs principles of the present invention.

With respect to FIG. 7, there is shown a schematic circuit diagram of an alternative embodiment of the sensing and transmitting means of a detecting and monitoring system constructed in accordance with the principles of this invention. As shown in FIG. 7, a plurality of sensing means in the form of seed sensors 201, 201a, and 201n are employed to respond to the passage of objects such as seeds through respectively associated seed dispensers (not shown) for generating a control signal. The total number of seed sensors of course depends upon the total number of seed dispensers used in the multi-row planter. The sensors are all substantially identical so only one is discussed in detail.

Sensor 201 may be any conventional sensing means suitable for generating a control signal whenever a seed passes through the sensor and the particular type of sensor is not critical to this embodiment of the invention. For example, sensor 201 may comprise a microswitch which is momentarily closed whenever a seed passes through the associated seed dispenser, and the closing of this microswitch could complete a circuit from a succeeding stage of the circuit to ground which could thereby enable that stage of the circuit to be energized. Alternative sensors such as those of the ultrasonic transducer type discussed hereinabove or a sensor employing a photoelectric system may also be employed.

A corresponding plurality of oscillating means associated with the sensors 201, 201a, and 201n are provided in the form of circuits 220, 220a, and 220n. All of these oscillating circuits are substantially identical so only one (220) is illustrated and discussed in detail. Circuit 220 comprises a switching transistor 221 and an amplifying transistor 222. Switching transistor 221 is biased such that it is normally turned off but is switched on whenever sensor 201 provides a suitable control signal which, in the embodiment of the invention illustrated in FIG. 7, is in the form of completing a path to ground from the base of switching transistor 221 through biasing resistor 223. Turning on switching transistor 221 applies a signal to the base of amplifying transistor 222 to turn it on also. A signal feedback path or loop is provided from the collector to the base of amplifying transistor 222 by means of a crystal 224 and its associated components to thus generate an oscillatory seed signal. The frequency of oscillation is determined primarily by crystal 224 and a capacitively-tuned coil 225 is utilized in the collector circuit of transistor 222 as an antenna to radiate or wirelessly transmit the thus-generated seed signal. In the embodiment of the invention illustrated in FIG. 7, the frequency of oscillation is chosen to be approximately 70 Mhz, with the plurality of oscillating circuits having their frequencies approximately spaced 25 Khz apart.

The range of the transmitter circuits illustrated in FIG. 7 is typically about 100 feet so that it is quite sufficient for conveying information from the planter to the tractor but yet not so strong as to interfere with receiving equipment in a planter in an adjacent field or farm, for example. Another advantage of the particular circuit illustrated in FIG. 7 is that the actuation of sensor 201 by a seed passing through the associated dispenser turns on the oscillating and transmitting circuit so that battery power (designated by reference character "V") is consumed only when a seed actuates the sensor. Thus, considerable conservation of battery power is achieved.

Figure 8A:
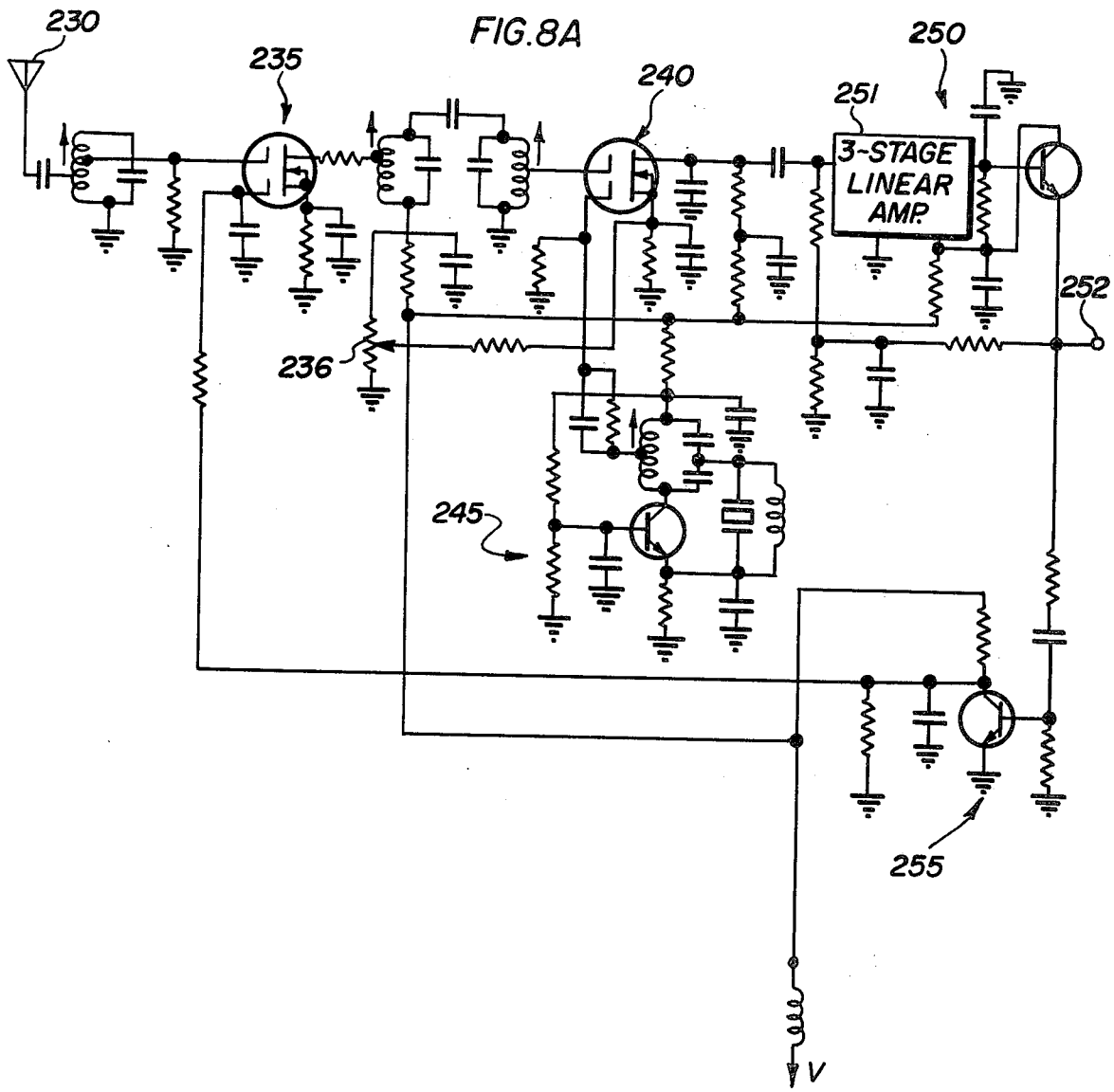
FIGS. 8A and B are a schematic circuit diagram of an alternative embodiment of a receiver which employs principles of the present invention.
Figure 8B:
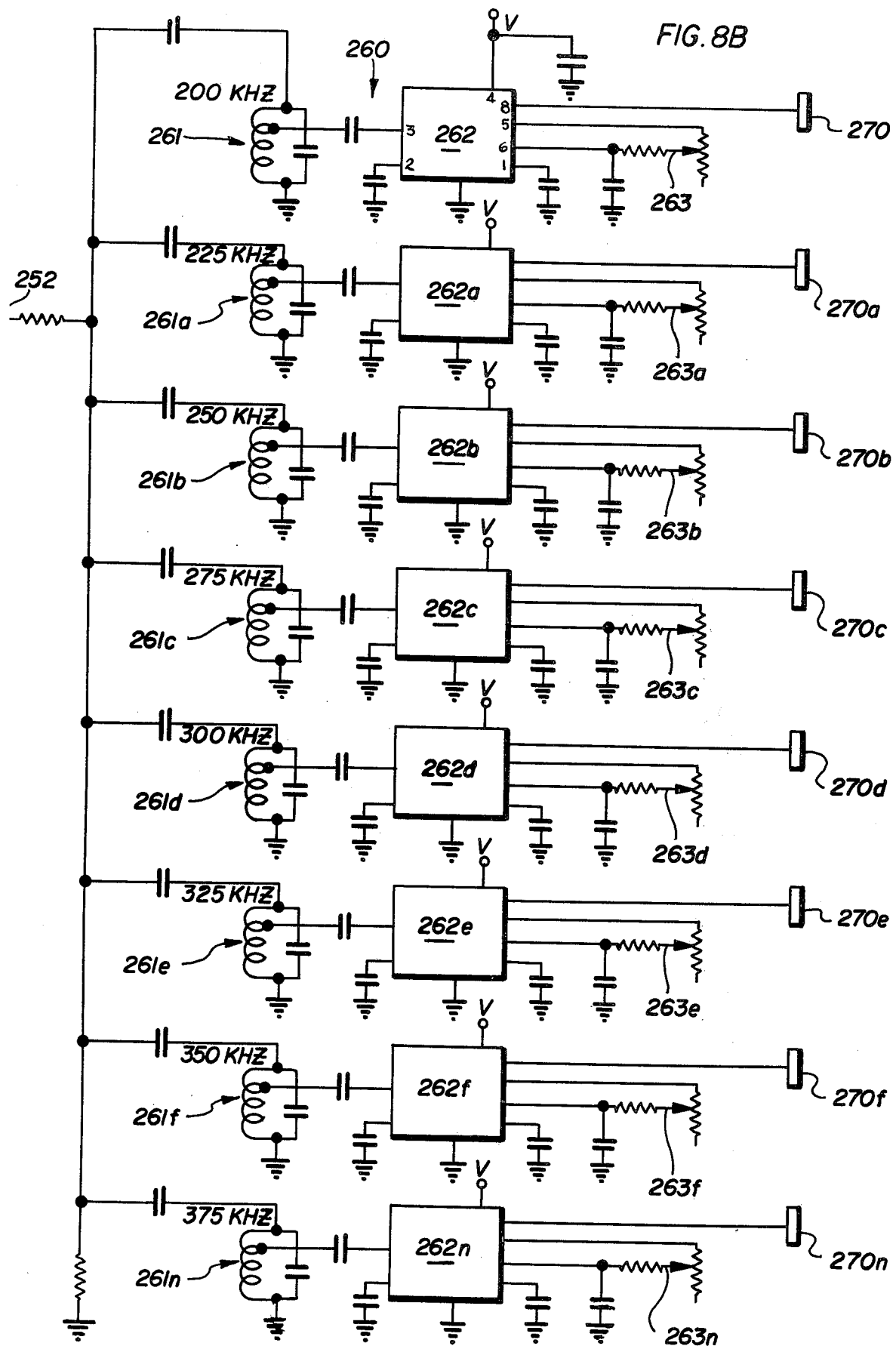

FIGS. 8A and 8B illustrate in schematic circuit diagram form an alternative embodiment of the receiving means of a detecting and monitoring system constructed in accordance with the principles of this invention and particularly adapted for use with the transmitting and sensing circuit illustrated in FIG. 7. This receiving circuit is responsive to the seed signals transmitted by the circuit of FIG. 7 for individually and simultaneously detecting the seed signals and producing corresponding indicator signals which are utilized by display means for selectively displaying the flow of seeds being dispensed in each row of the multi-row planting machine.

With respect to FIG. 8A, there is shown receiving means in the form of an antenna 230 and suitable radio receiving or "front end" circuitry comprising an r-f amplifier stage 235, a mixer stage 240, a local oscillator circuit 245 and an amplifier stage 250 which consists primarily of a three-stage, direct coupled linear amplifier 251 which may be obtained in an integrated circuit form as, for example, a Motorola linear amplifier No. 4010A. The receiver or "front end" circuitry thus described is essentially conventional and, by providing a linear amplification stage, intermodulation distortion is significantly reduced. In addition, an amplified AGC stage 255 is utilized to enhance the linear mode of operation. Because the front-end receiver circuitry thus described is essentially conventional it is not described in great detail. The receiver is relatively broadly tuned to the frequency range of 70-72 Mhz and the r-f gain thereof may be adjusted if desired by means of a potentiometer 236. The circuit is energized by a suitable voltage source V.

With reference to FIG. 8B, there is shown a preferred embodiment of the detector portion of the receiving means as well as the means for displaying selectively the flow of seeds being dispensed in each row of the multi-row planting machine. Specifically, the portion of the receiving means illustrated in FIG. 8B comprises a plurality of detectors 260 each of which is tuned to a different frequency corresponding to a different one of the plurality of seed signals transmitted by the circuit of FIG. 7. All of the detectors 260 are substantially identical so only one need be discussed in detail. The uppermost circuit in FIG. 8B comprises a detector stage including an LC tuned circuit 261 coupled to the input terminal of a phase-locked-loop detector circuit 262 which is utilized as a tone or frequency decoder.

The tuned circuit 261 is not essential in all applications of the invention but it is desirable in some applications because it prevents the phase-locked-loop decoder 262 from triggering on harmonics or sub-harmonics of the frequency of interest. Therefore tuned circuit 261 is utilized to provide a band-pass filter which passes the frequency of interest but not the harmonics and sub-harmonics thereof.

Phase-locked-loops suitable for detector 262 are commonly available in integrated circuit form from manufacturers such as Signetics, Motorola, and National Semiconductor. The small numbers within the block identified by reference character 262 identify the correspondingly-numbered pins or terminals of the actual integrated circuit package. A phase-locked-loop circuit is quite well known and recently has been manufactured in integrated circuit form. It is basically an electronic servo-loop consisting primarily of a phase detector, a low-pass filter, and a voltage controlled oscillator. In general, its controlled oscillator phase makes it capable of locking in or synchronizing with an incoming signal. If the phase changes, indicating the incoming frequency is changing, the phase detector output voltage increases or decreases just enough to keep the oscillator frequency the same as the incoming frequency, preserving the locked condition.

Some phase-locked-loop (PLL) circuits (e.g., Signetics' No. 567) are intended especially for use as tone or frequency decoders. The 567 PLL includes an oscillator, phase detector, and amplifier as well as a quadrature phase detector or multiplier. If the signal amplitude at the locked frequency is above a minimal value, a driver amplifier turns on to thus develop an output whenever an in-band tone is present. The 567 PLL is particularly useful in this application because it is optimized for both center frequency and bandwidth stability.

Detector 262 is programmed or tuned by the magnitude of the external resistance between terminals 5 and 6. In the embodiment of the invention illustrated in FIG. 8B, a variable resistor 263 is provided for this purpose. A suitable supply voltage V is applied at terminal 4 and the signal input is applied at terminal 3. The output signal is developed at terminal 8 in the form of an essentially open circuit when an inband input signal is not present and a significant current source when an inband input signal is present. The output signal in terminal 8 is applied to an indicating means 270 which may take the form of an indicator light or alpha-numerical readout, as desired.

Thus, there has been shown and described a new and improved detecting and monitoring system particularly adapted for individually and simultaneously detecting a flow of seeds being dispensed in each row of a multi-row planting machine of the type which has a separate seed dispenser for each row and which is towed by a tractor, and for conveying the seed flow information to the operator of the tractor. The system provides substantial advantages by providing for a simultaneous yet non-synchronous transmission of seed flow information so that each seed dispenser of the multi-row planter may be continuously monitored without the need for either a complicated time-sharing arrangement or for a complex wiring system among the various dispensers or between the seed sensors and the monitoring means. The elimination of the need for wiring between the planter and the tractor as well as the inter-dispenser wiring, greatly enhances the utility and reliability of this system, especially in a farm environment where wires and cables can easily be broken or become entangled in the farming machinery.

It will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

Various features of the invention are set forth in the following claims.

The invention is claimed as follows:

1. A detecting and monitoring system particularly adapted for individually and simultaneously detecting the flow of seeds being dispensed in each row of a multi-row planting machine of the type which has a separate seed dispenser for each row and which is towed by a tractor, and for conveying said seed flow information to the operator of the tractor, comprising: a plurality of sensing means respectively associated with each said dispenser and responsive to the passage of seeds through said dispensers for generating asynchronously a corresponding plurality of control signals; a corresponding plurality of oscillating means respectively associated with said plurality of sensing means for generating a plurality of unmodulated carrier-wave seed signals, with each said oscillating means having a different frequency of oscillation and respectively responsive to one of said control signals for being energized to generate and wirelessly transmit a unmodulated carrier-wave seed signal corresponding to the flow of seeds passing through the respective one of said dispensers; receiving means responsive to said transmitted unmodulated carrier-wave seed signals for individually and simultaneously detecting said seed signals and producing corresponding indicator signals, said receiving means including a single-channel intermediate frequency amplifier circuit having a pass band which encompasses the frequencies of all said transmitted seed signals, and further including a corresponding plurality of frequency detectors coupled to said single-channel intermediate frequency amplifier circuit, with each said frequency detector being tuned to a different one of said transmitted unmodulated carrier-wave seed signal frequencies for detecting said seed signals and producing said indicator signals; and display means responsive to said indicator signals for displaying selectively the flow of seeds being dispensed in each row of a multi-row planting machine.

2. A detecting and monitoring system in accordance with claim 1, in which said receiving means includes means for converting said seed signals into corresponding lower-frequency signals, and in which said plurality of frequency detectors further includes a corresponding plurality of phase-locked-loop frequency detectors simultaneously responsive to said lower-frequency signals for individually detecting which seed signals are being received and producing said indicator signals.

3. A detecting and monitoring system in accordance with claim 2, in which a filter is coupled to the input of said phase-locked-loop detector for removing harmonic and subharmonic frequency components from the input signal to said phase-locked-loop detector.

4. A detecting and monitoring system in accordance with claim 1, in which each said oscillating means includes a crystal-controlled transistor oscillator circuit for generating said unmodulated carrier-wave seed signal, including an oscillator transistor, said oscillator transistor having a base, a collector and an emitter, said oscillator circuit having a capacitively-tuned coil coupled to the collector of said oscillator transistor for transmitting said seed signal.

5. A detecting and monitoring system in accordance with claim 4, in which said control signal is a DC signal and which further includes a switching transistor coupled to the base of said oscillator transistor and responsive to the application of said respective control signal for biasing said oscillator transistor on, whereby each said oscillating means is energized in response to said control signal.

6. A detecting and monitoring system in accordance with claim 1, in which said receiving means further includes an RF amplifier circuit coupled to the input of said intermediate frequency amplifier circuit and an amplified AGC circuit coupled from the output of said single-channel intermediate frequency amplifier circuit to the input of said RF amplifier circuit and biased to operate said receiver in a linear mode, to thereby reduce intermodulation distortion.

* * * * *